United States Patent
Armstrong et al.

(10) Patent No.: US 7,506,253 B2
(45) Date of Patent: Mar. 17, 2009

(54) METHODS AND APPARATUS FOR RECORDING WEB INFORMATION

(75) Inventors: John Armstrong, Half Moon Bay, CA (US); Victor Thu, Santa Clara, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 300 days.

(21) Appl. No.: 10/850,644

(22) Filed: May 21, 2004

(65) Prior Publication Data

US 2005/0262438 A1 Nov. 24, 2005

(51) Int. Cl.
*G06F 17/00* (2006.01)
(52) U.S. Cl. ...................... 715/256; 715/243
(58) Field of Classification Search ............... 715/517, 715/531, 243, 256
See application file for complete search history.

(56) References Cited

U.S. PATENT DOCUMENTS

| | | | |
|---|---|---|---|
| 6,947,162 B2* | 9/2005 | Rosenberg et al. | 358/1.15 |
| 2002/0083121 A1 | 6/2002 | Chang et al. | |
| 2002/0095352 A1 | 7/2002 | Hitaka | |
| 2003/0074672 A1* | 4/2003 | Daniels | 725/110 |
| 2003/0088518 A1 | 5/2003 | Kirk et al. | |
| 2003/0115284 A1* | 6/2003 | Henry | 709/217 |
| 2003/0217109 A1* | 11/2003 | Ordille et al. | 709/206 |
| 2004/0196481 A1* | 10/2004 | Jacobsen | 358/1.11 |
| 2005/0067482 A1* | 3/2005 | Wu et al. | 235/375 |
| 2005/0091135 A1* | 4/2005 | Britton | 705/35 |
| 2005/0157349 A1* | 7/2005 | Pangrazio et al. | 358/442 |
| 2005/0216492 A1* | 9/2005 | Singhal et al. | 707/100 |

FOREIGN PATENT DOCUMENTS

WO    WO 02/41107    5/2002

OTHER PUBLICATIONS

Ahrens, Virginie, et al, "Paper to HTML—An Automatic, Seamless Process for Documentation Production", Proceedings of the 17th Annual International Conference on Computer Documentation, Oct. 1999, pp. 138-143.*

Lie, Hakon Wium, et al, "Multipurpose Web Publishing Using HTML, XML, and CSS", Communications of the ACM, vol. 42, Issue 10, Oct. 1999, pp. 95-101.*

* cited by examiner

*Primary Examiner*—Laurie Ries
(74) *Attorney, Agent, or Firm*—Michael A. Glenn; Glenn Patent Group

(57) ABSTRACT

Methods, systems and apparatus are provided that capture a full page of information displayed in a web browser in a native format, convert the native format data to an intermediate format, and communicate the intermediate format data over a network to an output server. The intermediate format data are received from the network at the output server, converted to an output format, and then communicated to an output device, such as a printer, copier, facsimile device, document storage device, email server or other similar device, for recording.

36 Claims, 8 Drawing Sheets

METHODS AND APPARATUS FOR RECORDING WEB INFORMATION

BACKGROUND

Within the last decade, the use, scope and availability of the Internet have dramatically increased. Indeed, the Internet now may be used to access vast amounts of information, and perform a wide array of tasks. For example, a user connected to the Internet via a personal computer, personal organizer, web-enabled cellular telephone, or other similar device (collectively referred to herein as "Client Devices") can obtain information about the latest news, show times, weather forecasts, driving directions, airline flight status, credit card balances, bank account statements, and a wide array of other information. In addition, a user may order products, schedule services, transfer funds, select seats, check in for a flight, and perform numerous other tasks from the convenience of a Client Device.

Typically, a user accesses the Internet via a web browser, such as Internet Explorer by Microsoft Corporation, Redmond, Wash., Netscape Navigator by Netscape Communications Corp., Mountain View, Calif., or other similar web browser. While browsing the Internet, a user often will want to print, email, or otherwise record the information displayed in a web browser. For example, a user may check in to a flight, and then want to print a boarding pass displayed in a browser window during the online check-in process. If the Client Device is coupled to a printer, the user may simply issue a print command from within the web browser to print the boarding pass.

In numerous instances, however, a Client Device may not be coupled to a printer or other device for recording information displayed in a web browser. For example, a user may be connected to the Internet via a public Internet access facility, such as an Internet café, hotel, airport lounge, or similar public space that provides network access. Although such a public Internet access facility provides network access, it may not provide printer access, and the user therefore may not have immediate ability to print information displayed in a web browser.

Even if a public Internet access facility provides one or more printers, such devices may not be readily accessible to all users. For example, a user may browse the Internet on a Client Device at an Internet café that allows wireless access to a local printer. Before the user may send a print job to the printer, however, the user typically must install a printer driver for the printer. For instance, the Internet café may host a web site that includes a link for installing an appropriate printer driver on the user's Client Device, or may provide a web address for the printer manufacturer's driver download web page. The user may be reluctant to download the driver, however, because such software typically consumes significant computer storage. Although many laptop computers include large disk drives, other Client Devices, such as handheld computers, personal organizers, and cellular telephones may have much less abundant disk space. As a result, installing large printer drivers on such devices may not be feasible. Further, the time required to download a printer driver from a manufacturer's website and then determine how to configure the printer driver may be very time consuming and difficult for some users.

One previously known technique for printing, archiving, faxing or otherwise recording web information involves saving the information to a file on the Client Device, and then subsequently retrieving the file for offline processing. For example, the user at the Internet café may save information displayed in the browser as a hypertext markup language ("HTML") file on the user's Client Device, and may then email the saved file for subsequent printing at another location (e.g., at an office printer via the user's desktop computer). This technique may be ineffective, however, because the saved file may not include all of the information that originally was displayed in the browser. For example, if a web page includes dynamically generated content linked to a remote server, such as an online bank statement, the dynamic content may not be included when the browser image is saved to an HTML file. As a result, the subsequently printed image may not include the information that the user actually wished to print.

Another previously known technique for printing browser content uses the "Web Capture" feature of Acrobat, by Adobe Systems, Inc., San Jose, Calif. In particular, if the Client Device is a computer running a Windows operating system, and is viewing a web page using an Internet Explorer 5.01 or later web browser, the browser toolbar includes a button that may be used to convert a web page to a portable document format ("PDF") file on the Client Device, and then either save the PDF file on the Client Device or print the PDF file to a printer attached to the Client Device. Alternatively, a user may open a web page from within Acrobat, which will then convert the web page to a PDF file that may be saved on or printed from the Client Device.

The Web Capture feature, however, has numerous disadvantages. First, if a web page includes dynamically generated content linked to a remote server, that content may not be included when the displayed image is converted to a PDF file. As a result, the subsequently saved or printed image may not include the information that the user wishes to record. Second, it may be impossible for a user to browse certain web pages from within Acrobat. For example, if a user's bank account web page may be viewed only after providing a username and password entry for account access, and the user enters the web address of the sign-on screen, Acrobat immediately converts that web page to a PDF file, and the user is unable to enter the sign-on information necessary to access the account information web page. As a result, Web Capture may be useless for processing content included in many desirable web pages.

In view of the foregoing, it would be desirable to provide methods and apparatus for recording information displayed in a web browser.

It further would be desirable to provide methods and apparatus for printing information displayed in a web browser without requiring installation of a printer driver.

It additionally would be desirable to provide methods and apparatus for recording information displayed in a web browser that includes dynamically generated content.

SUMMARY

In view of the foregoing, it is an object of this invention to provide methods and apparatus for recording information displayed in a web browser.

It further is an object of this invention to provide methods and apparatus for printing information displayed in a web browser without requiring installation of a printer driver.

It additionally is an object of this invention to provide methods and apparatus for recording information displayed in a web browser that includes dynamically generated content.

These and other objects of this invention are accomplished by providing methods, systems and apparatus that capture a full page of information displayed in a web browser in a native format, convert the native format data to an intermediate format, and communicate the intermediate format data over a network to an output server. The intermediate format data are received from the network at the output server, converted to an output format, and then communicated to an output device, such as a printer, copier, facsimile device, document storage device, email server or other similar device, for recording.

BRIEF DESCRIPTION OF THE DRAWINGS

The above-mentioned objects and features of the present invention can be more clearly understood from the following detailed description considered in conjunction with the following drawings, in which the same reference numerals denote the same elements throughout, and in which.

DETAILED DESCRIPTION

Methods, systems and apparatus in accordance with this invention capture a full page of information displayed in a web browser in a native format, convert the native format data to an intermediate format, and communicate the intermediate format data over a network to an output server. The intermediate format data are received from the network at the output server, converted to an output format, and then communicated to an output device, such as a printer, copier, facsimile device, document storage device, email server or other similar device, for recording. Such recording may include printing, faxing, archiving, emailing or similarly recording the information captured from the web browser.

Figure 1:
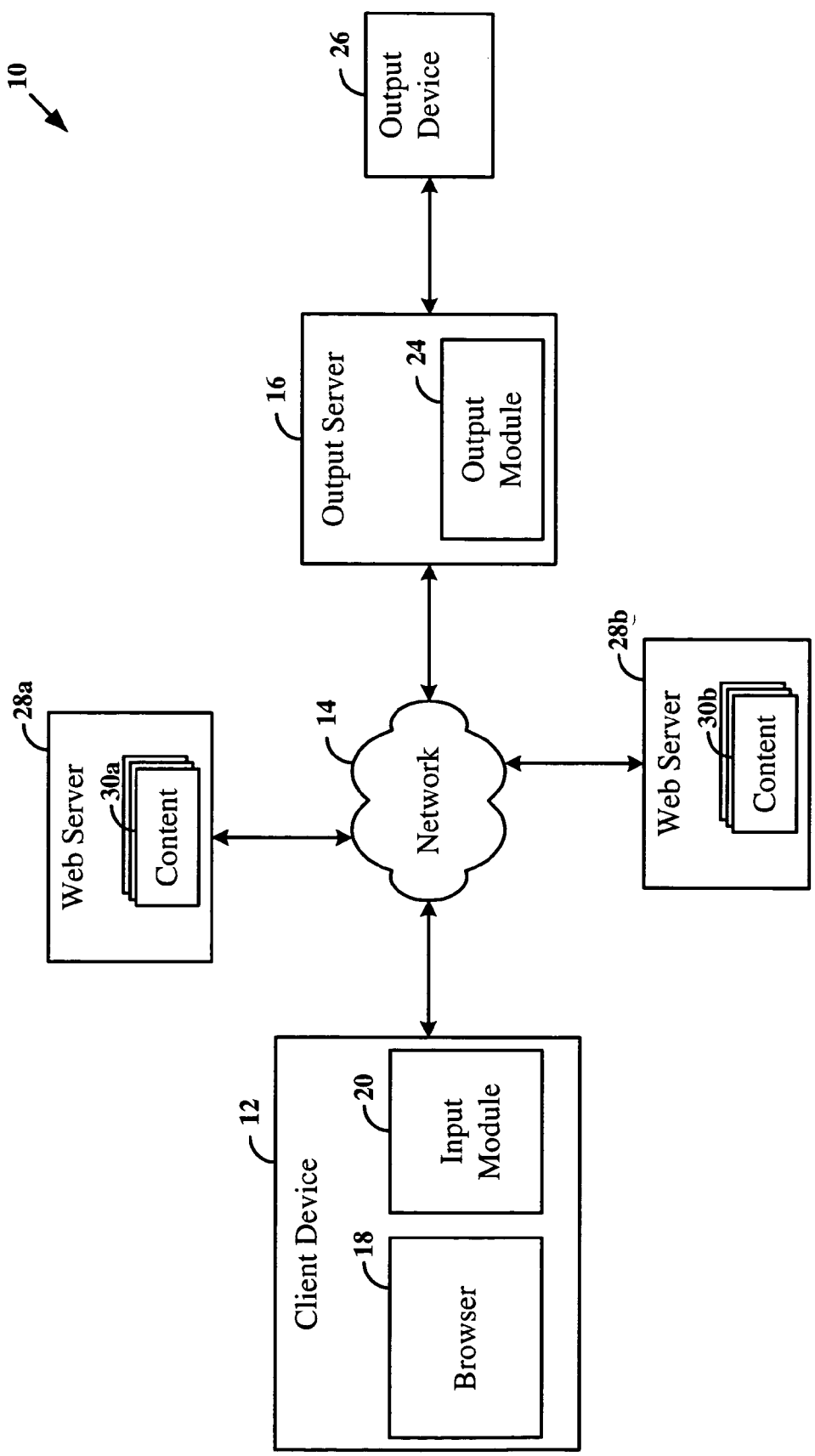
FIG. 1 is a block diagram of an exemplary system in accordance with this invention.

Referring to FIG. 1, an exemplary system in accordance with this invention is described. System 10 includes client device 12 coupled via network 14 to output server 16. Client device 12 may be a personal computer, laptop computer, desktop computer, handheld computer, personal digital assistant, cellular telephone or other similar device that includes web browser 18 and input module 20. Web browser 18 may be any conventional browser for searching for and displaying web content. For example, web browser 18 may be an Internet Explorer web browser, Netscape Navigator web browser, or other similar web browser. Input module 20, described in more detail below, captures information displayed in web browser 18, converts the captured information from a native format to an intermediate format, and communicates the intermediate format data to output server 16 via network 14.

Network 14 may be a local area network, wide area network, wireless network, public network, the Internet, or other similar network. Output server 16 may be a personal computer, desktop computer, laptop computer, handheld computer, personal digital assistant, workstation, or other similar computer. Output server 16 includes output module 24, described in more detail below, that receives the intermediate format data from client device 12, converts the intermediate format data to an output format, and then communicates the output format data to output device 26. Output device 26 may be a printer, print server, copier, facsimile device, email server, storage device, document management system, or other similar output device for processing the information captured from web browser 18.

System 10 also includes one or more web servers 28 coupled to network 14, with each web server including one or more web pages 30 that may be displayed by web browser 18. Each web server 28 may be a personal computer, desktop computer, laptop computer, handheld computer, personal digital assistant, workstation, or other similar computer that may be used to host web pages 30. Web servers 28a and 28b may be a single device or may be multiple devices, and may be located together or distributed across multiple locations. Web pages 30 may include information that may be displayed on web browser 18. For example, web server 28a may be an Internet web server for a financial institution, and web page 30a may be client bank account information. Web server 28b may be a corporate Intranet web server, and web page 30b may be employee schedule information. Persons of ordinary skill in the art will understand that system 10 may include additional web servers 28, and that each web server may include other types of information in web pages 30.

Figure 2:
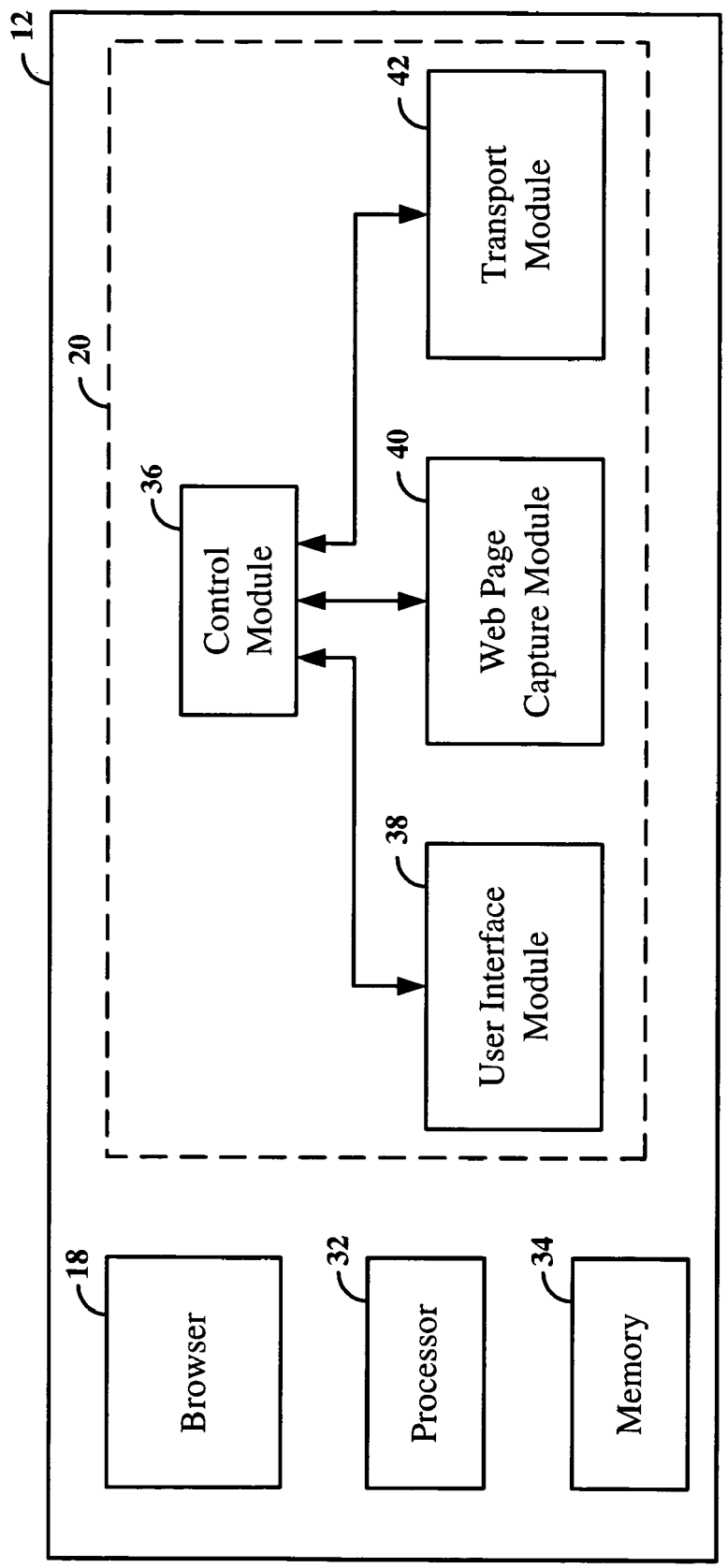
FIG. 2 is a block diagram of a client device that includes an exemplary input module in accordance with this invention.

Referring now to FIG. 2, exemplary client device 12 is described. Client device 12 includes web browser 18, input module 20, processor 32 and memory 34. Processor 32 may be a general purpose microprocessor, application specific integrated circuit processor, computer processor, or other similar processor device. Memory 34 may be any conventional magnetic, optical or similar memory device, such as a hard disk, floppy disk, optical disk, random access memory, or similar memory device. Input module 20 includes control module 36, user interface module 38, web page capture module 40, and transport module 42. Control module 36 may include hardware and/or software that may be used to communicate with and control user interface module 38, web page capture module 40 and transport module 42. Each of control module 36, user interface module 38, web page capture module 40 and transport module 42 may include software stored in memory 34 and implemented by processor 32.

User interface module 38 may be any conventional user interface hardware and/or software for providing and processing user-selectable options for web page processing in accordance with this invention. For example, user interface module 38 may provide one or more user-selectable options for printing, faxing, archiving, emailing, or otherwise processing information displayed in web browser 18. The user-selectable options may be provided and selected via one or more conventional user interface devices, such as a keyboard, monitor, mouse, speaker, microphone, telephone or other similar device or combination of devices.

Web page capture module 40 may be any conventional hardware and/or software that may be used to capture the full page of information displayed in a web browser (referred to herein as a "webshot"). For example, web page capture module 40 may be Precision Display Capture by Daniele Paolo Scarpazza, or other similar web page capture hardware and/or software. Web pages are typically displayed in a native format, such as an HTML format. Web page capture module 40 may convert the information displayed in web browser 18 from a native HTML format to an intermediate format, such as a bitmap ("BMP"), graphics interchange format ("GIF"), Joint Photographic Experts Group ("JPEG"), tagged image file format ("TIFF"), portable network graphic ("PNG"), or other similar format. Web page capture module 40 may then store the intermediate format data in memory 34.

Transport module 42 may be any conventional hardware and/or software that may be used to communicate the intermediate format data to output server 16 via network 14. For example, the transport module may be any conventional software that may send the intermediate format data to output server 16 in accordance with a hypertext transport protocol ("HTTP"), secure hypertext transport protocol ("SHTTP" or HTTPS"), or other similar transport protocol.

Figure 3:
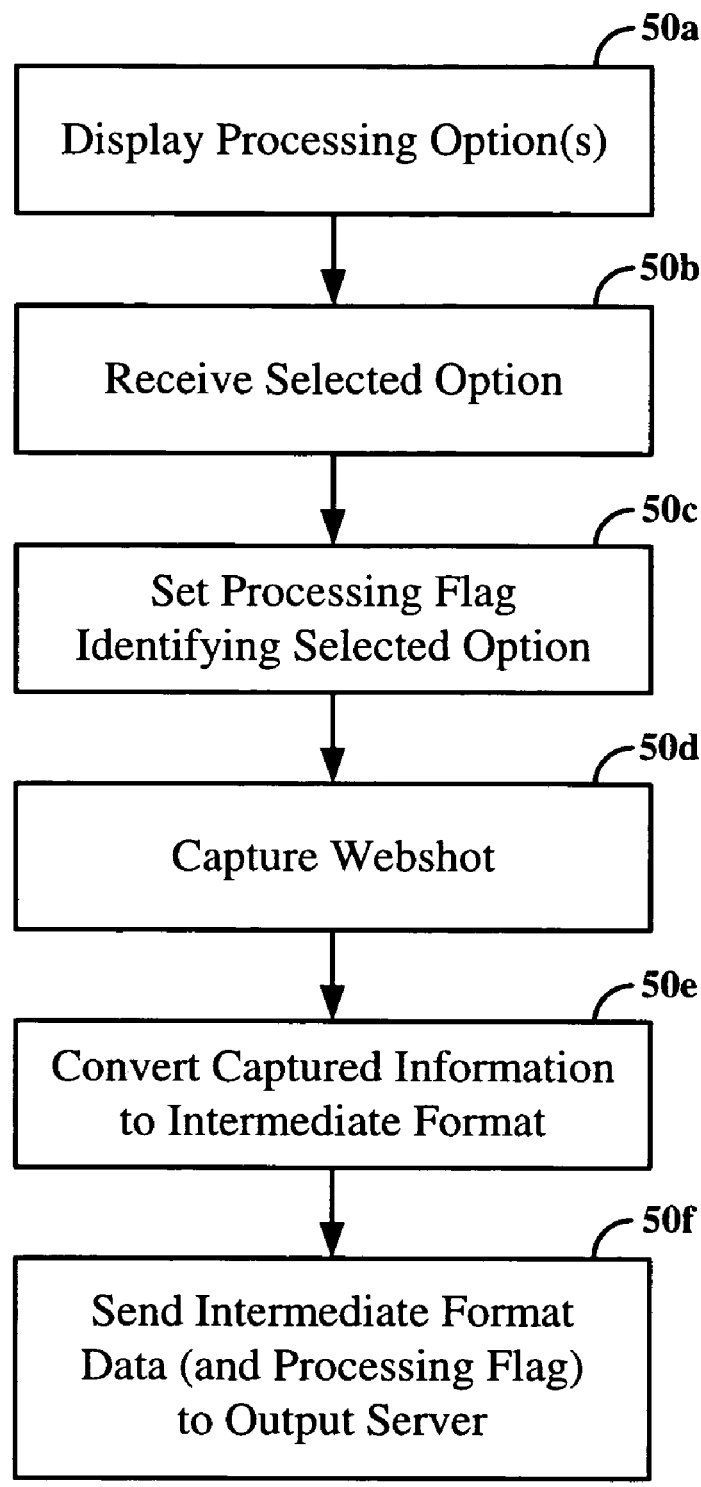
FIG. 3 is a flow diagram of an exemplary input process in accordance with this invention.

Referring now to FIGS. 2 and 3, an exemplary method implemented by input module 20 is described. Beginning at step 50*a*, one or more user-selectable options are displayed for processing information displayed in web browser 18. For example, control module 36 may instruct user interface module 38 to display one or more options for printing, faxing, archiving, emailing or otherwise processing the information displayed in the browser. For instance, user interface module 38 may display the available processing options in or near the browser display. Next, at step 50*b*, a user-selected option is received. For example, control module 36 may instruct user interface module 38 to receive the user's selected option from a keyboard, touch screen, mouse or similar input device.

Next, at step 50*c*, control module 36 may set a flag to indicate the selected option. For example, if user interface module 38 displays four processing options (e.g., printing, faxing, archiving, and emailing), control module 36 may use a two-bit binary processing flag to indicate the user's selection as follows:

| Processing Option | Processing Flag |
|---|---|
| Print | 00 |
| fax | 01 |
| archive | 10 |
| email | 11 |

Persons of ordinary skill in the art will understand that other techniques may be used to indicate the user's selected processing option, and that step 51 optionally may be omitted if user interface module 38 displays only a single processing option (e.g., printing).

Next, at step 50*d*, the information in web browser 18 is captured. For example, control module 36 may instruct web page capture module 38 to capture a webshot of the information displayed in web browser 18. Web pages are typically displayed in a native format, such as an HTML format. Although HTML is widely used for displaying web page information, HTML is not generally used by printers and other output devices. Thus, at step 50*e*, the captured image may be converted from the native format to an intermediate format, such as BMP, GIF, JPEG, TIFF, PNG, or other similar format.

Next, at step 50*f*, the intermediate format data are communicated to output server 16. For example, control module 36 may instruct transport module 42 to send the intermediate format data to output server 16 via network 14. Transport module 42 also may send the processing flag from step 50*c* to output server 16. For example, transport module 42 may send the processing flag from step 50*c* along with the intermediate format data.

Figure 4:
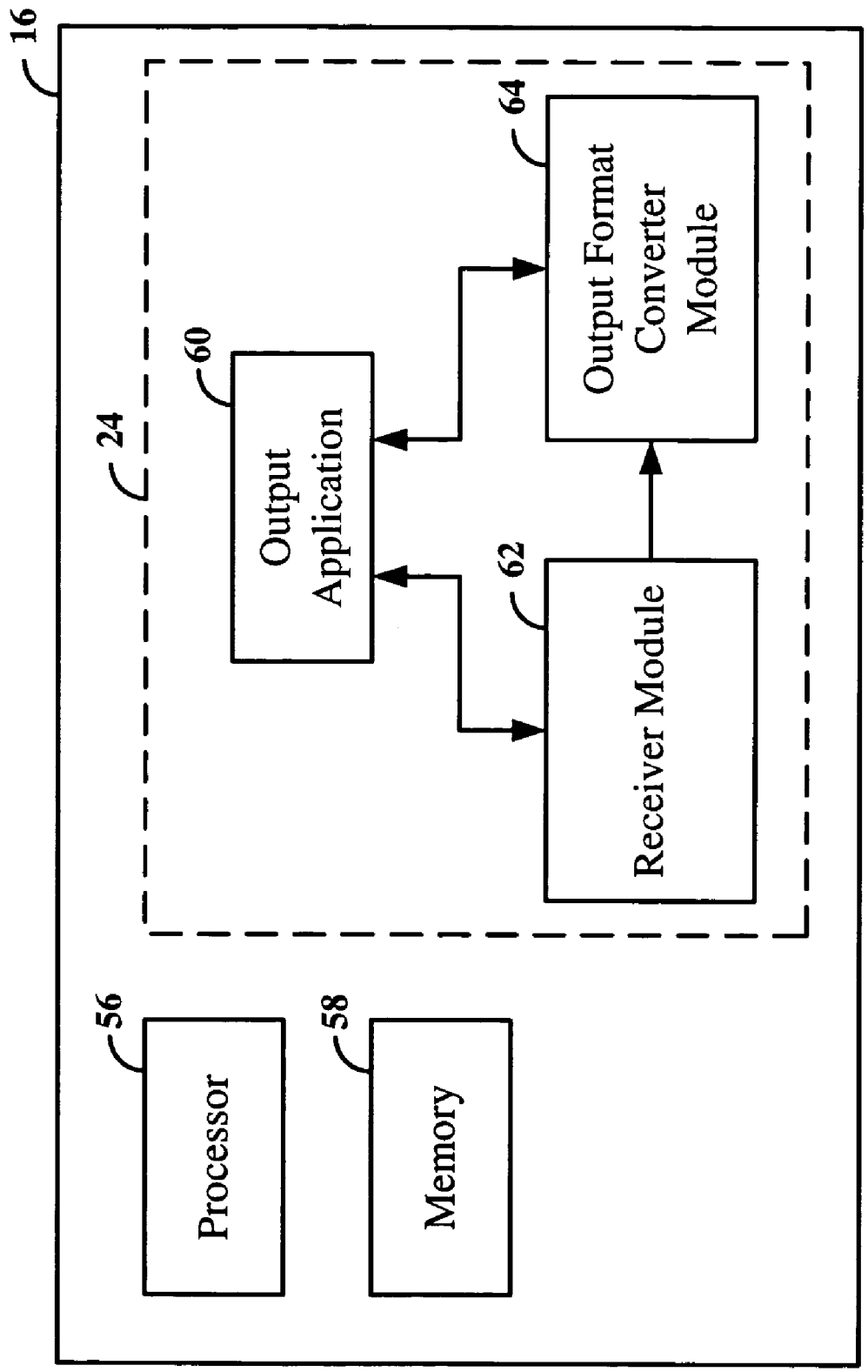
FIG. 4 is a block diagram of an output server that includes an exemplary output module in accordance with this invention.

Referring now to FIG. 4, an exemplary output server 16 is described. Output server 16 includes output module 24, processor 56 and memory 58. Processor 56 may be a general purpose microprocessor, application specific integrated circuit processor, computer processor, or other similar processor device. Memory 58 may be any conventional magnetic, optical or similar memory device, such as a hard disk, floppy disk, optical disk, random access memory, or similar memory device. Output module 24 includes output application 60, receiver module 62 and output format converter module 64. Output application 60 may include hardware and/or software that may be used to communicate with and control receiver module 62 and output format converter module 64. Each of output application 60, receiver module 62 and output format converter module 64 may include software stored in memory 58 and implemented by processor 56.

Receiver module 62 may be any conventional hardware and/or software that may be used to receive the intermediate format data from input module 20. For example, receiver module 62 may be a web server running Java or Perl software that can accept the intermediate format data, or may be a remote file system using a network file system ("NFS") protocol, such as the NFS protocol developed by Sun Microsystems, Inc., Santa Clara, Calif., U.S.A. Output format converter module 40 may be any conventional hardware and/or software that may be used to convert intermediate format data to an output format required by output device 26 (referred to herein as "output format data"). For example, output format converter module 40 may include a library that can be used to convert the intermediary format data to a PostScript, PDF, or other similar page description language ("PDL"). Alternatively, output format converter module 40 may include an operating system print driver that can render the data into printer-ready data.

In particular, if output device 26 is a printer, output format converter module 40 may be software and/or hardware that may be used to convert the intermediate format data to a print stream required by the printer. Thus, if output device 26 is a PostScript printer, output format converter module 40 may be a software module that may be used to convert the intermediate format data to a PostScript PDL print stream. Alternatively, if output device 26 is a document management system, output format converter module 40 may be a software module that may be used to convert the intermediate format data to a data stream that may be used by the document management system. For example, if output device 26 is a Content Server document management system by Documentum, Inc., Pleasanton, Calif., output format converter module 40 may be a software module that may be used to convert the intermediate format data to a Content Server data stream.

Figure 5:
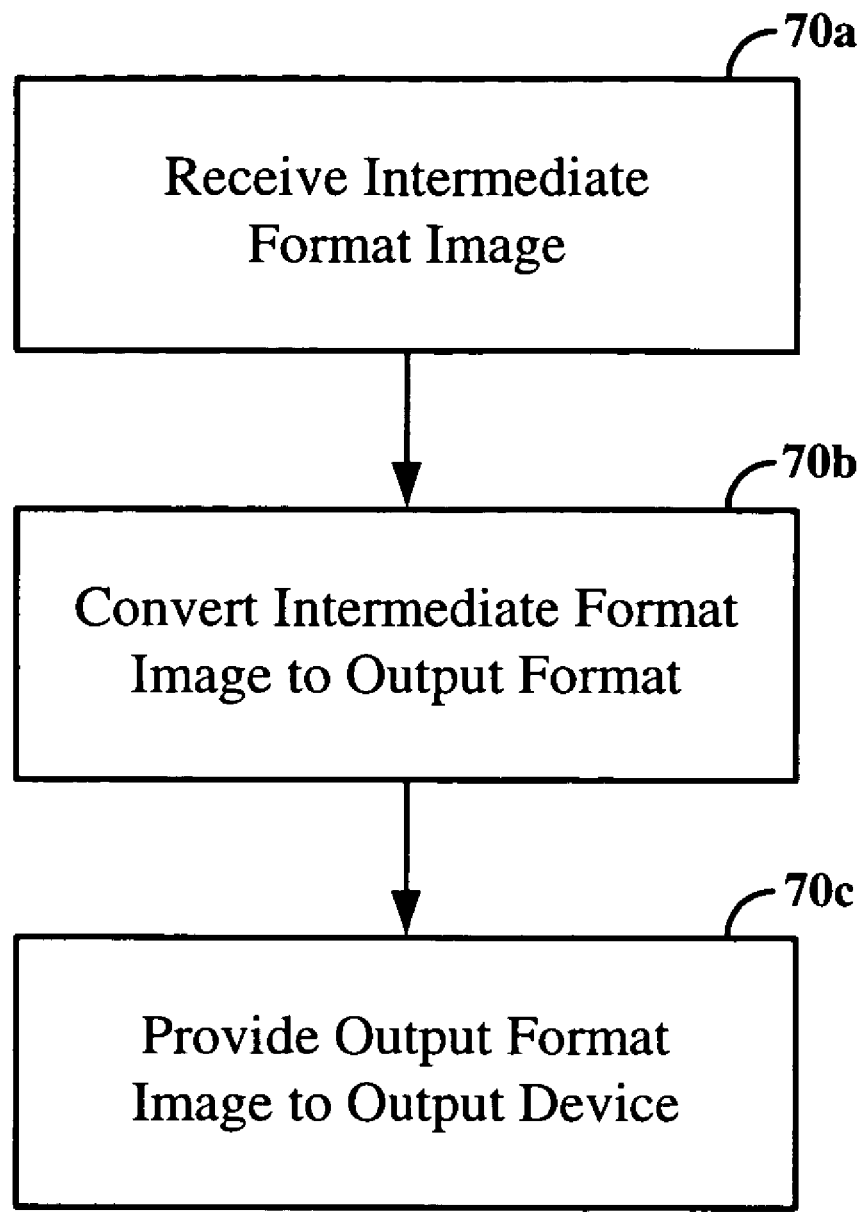
FIG. 5 is a flow diagram of an exemplary output process in accordance with this invention.

Referring now to FIGS. 4 and 5, an exemplary output processing method in accordance with this invention is described. Beginning at step 70*a*, intermediate format data are received. For example, output application 60 may instruct receiver module 62 to receive intermediate format data from client device 12 via network 14. Next, at step 70*b*, the intermediate format data received in step 70*a* are converted to an output format. For example, output application 60 may instruct output format converter module 64 to convert the intermediate format data to the output format required by output device 26. Next, at step 70*c*, the output format data from step 70*b* are provided to output device 26. For example, output application 60 may send the output format data to output device 26.

Thus, referring again to FIGS. 1-4, if output device 26 is a printer, and user interface 38 module 20 displays a "Print" option in web browser 18, a user of Client Device 12 displaying web page 30a in the web browser may print the web page by selecting the print option. As a result, web page capture module 40 captures a webshot of the displayed information and converts the information to an intermediate format, and transport module then sends the intermediate format data via network 14 to output server 16. Receiver module 62 in output server 16 receives the intermediate format data, and output format converter module 64 then converts the intermediate format data to a print stream, which is then sent to printer 26 for printing.

Figure 6:
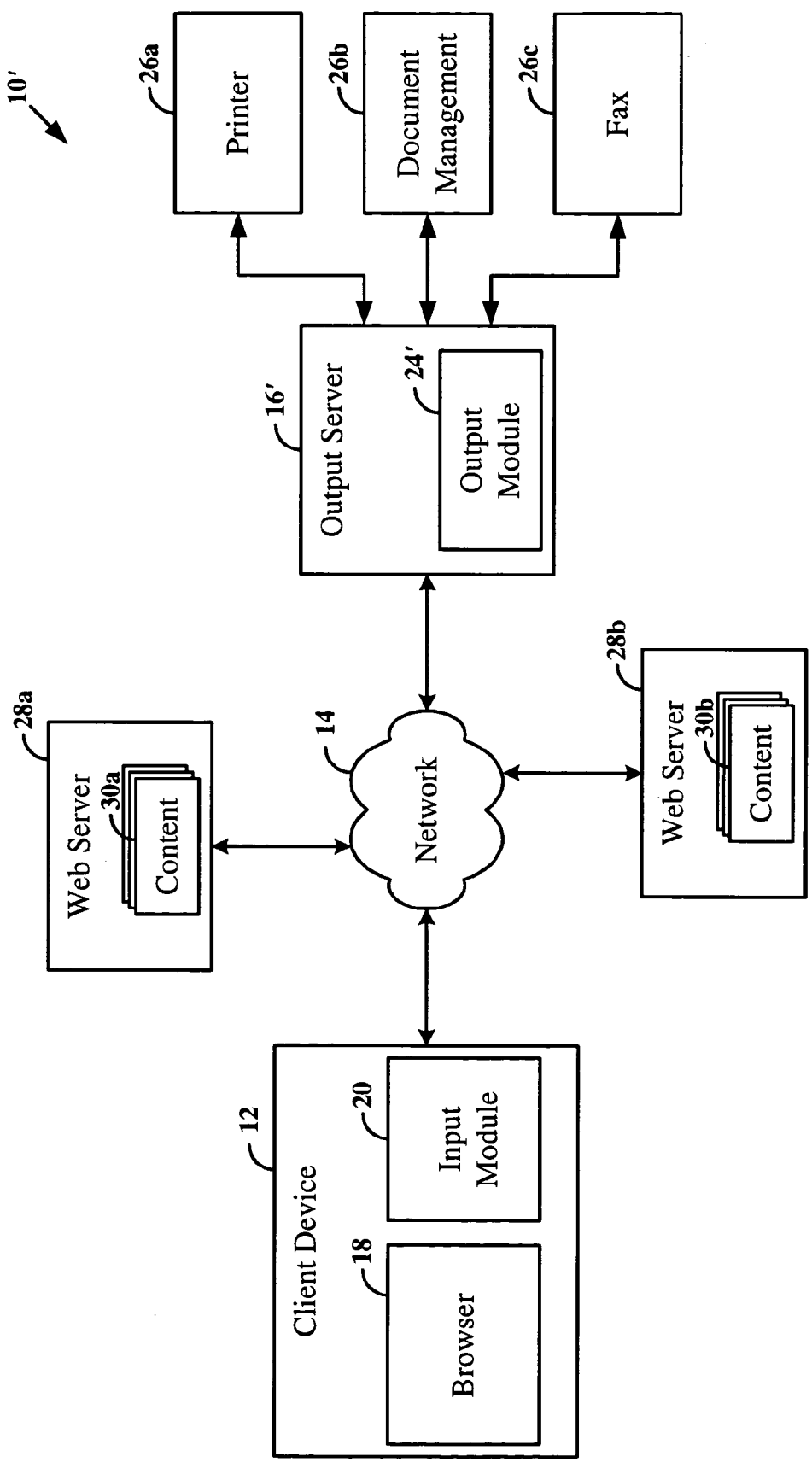
FIG. 6 is a block diagram of an alternative exemplary system in accordance with this invention.

Referring to FIG. 6, an alternative exemplary system in accordance with this invention is described. System 10' includes output server 16', which may be a personal computer, desktop computer, laptop computer, handheld computer, personal digital assistant, workstation, or other similar computer that includes output module 24'. Output server 16' is coupled to one or more output devices 26. In the illustrated example, output server 16' is coupled to printer 26a, document management system 26b, and facsimile device 26c. Persons of ordinary skill in the art will understand that output server 16' may be connected to more or fewer than three output devices 26, and that output devices 26 may include devices other than those shown in FIG. 6.

Figure 7:
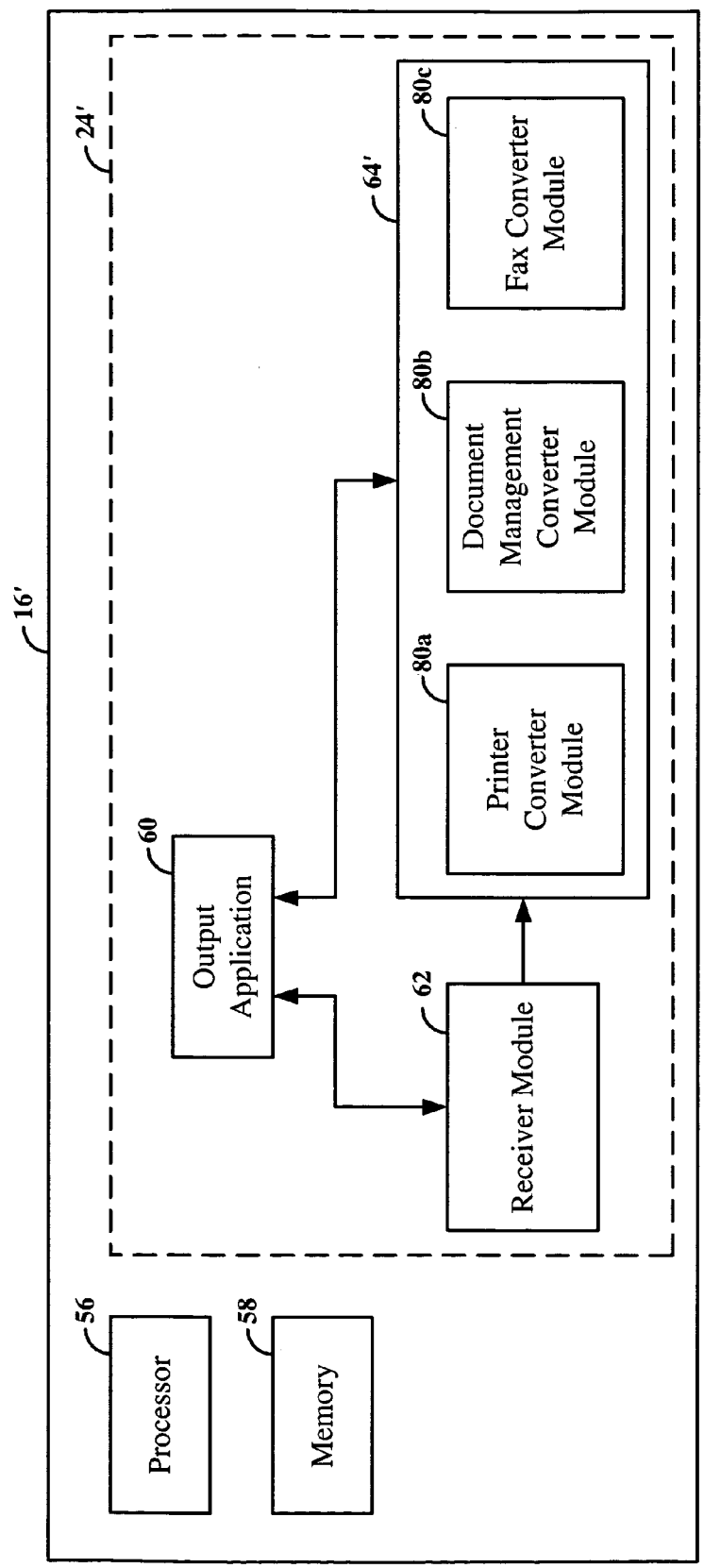
FIG. 7 is a block diagram of an output server that includes an alternative exemplary output module in accordance with this invention.

Referring now to FIG. 7, an exemplary output module 24' is described. Output module 24' includes output format converter module 64', which includes one or more output converter modules 80'. In the illustrated example, output format converter module 64' includes printer converter module 80a, document management converter module 80b, and facsimile converter module 80c. Printer converter module 80a may be any conventional software and/or hardware module for converting intermediate format data to print stream data required by printer 26a. Similarly, document management converter module 80b may be any conventional software and/or hardware module for converting intermediate format data to document management system data required by document management system 26b. Likewise, facsimile converter module 80c may be any conventional software and/or hardware module for converting intermediate format data to facsimile data required by facsimile machine 26c.

Persons of ordinary skill in the art will understand that output format converter module 64' may comprise a single module (as illustrated in FIG. 7), or may include multiple modules. Further, persons of ordinary skill in the art will understand that each output converter module 80' may comprise multiple modules that each perform a single type of format conversion (as illustrated in FIG. 7), or may include one or more modules that may perform multiple types of format conversion.

Figure 8:
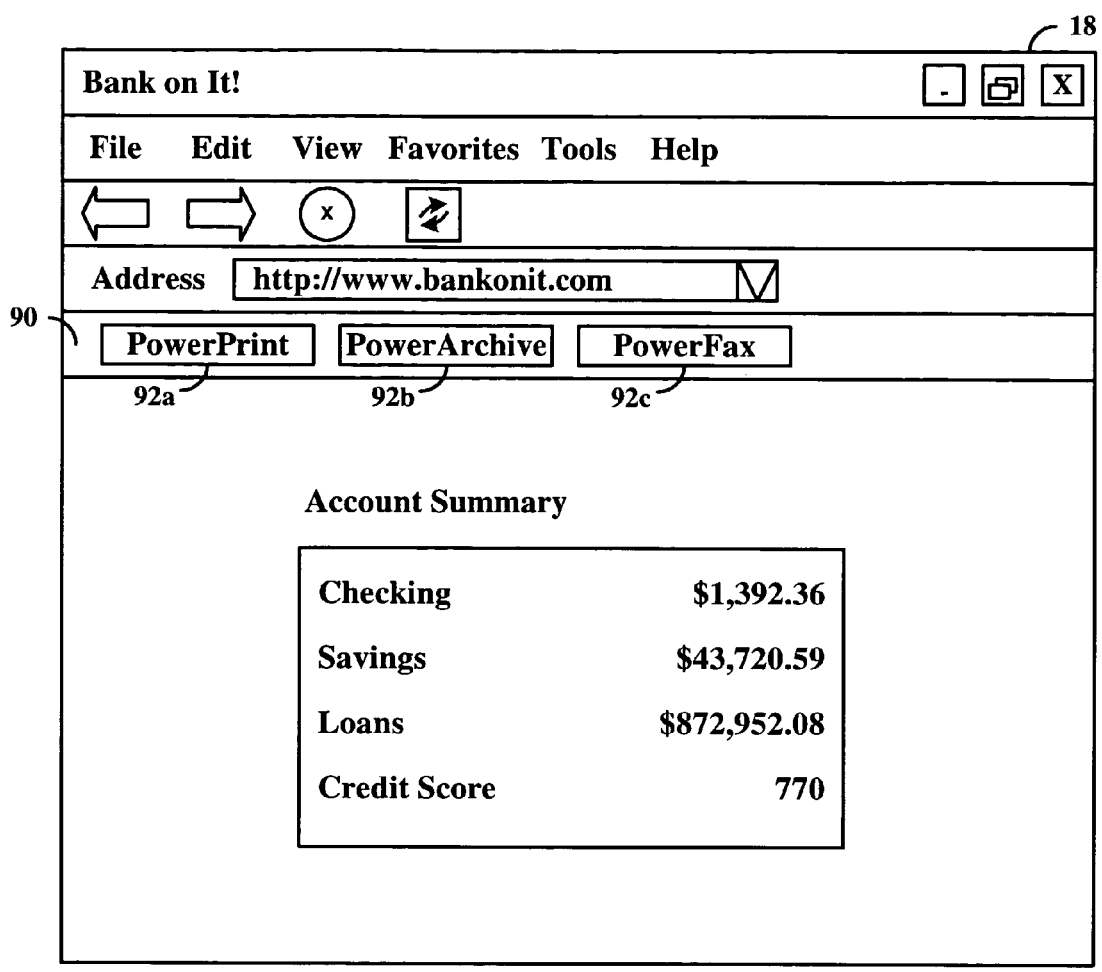
FIG. 8 is a diagram of a web browser that includes an exemplary toolbar in accordance with this invention.

Referring now to FIGS. 2, 6 and 8, an exemplary user interface for use with input application 36 is described. User interface 90 may be implemented as a toolbar installed in web browser 18, and includes one or more icons 92 used to provide user-selectable options for processing information displayed in web browser 18. For example, print icon 92a may be used to issue a "print" command, archive icon 92b may be used to issue an "archive" command, and fax icon 92c may be used to issue a "fax" command. For example, if a user selects print icon 92a, control module 36 may cause web page capture module 38 to capture a webshot of the information displayed in web browser 18. Intermediate format converter module 40 may then convert the native format information to an intermediate format, and transport module 42 may then communicate the intermediate format data to output server 16 for printing on printer 26a. Alternatively, if a user selects archive icon 92b, the web browser information may be captured in a native format, converted to an intermediate format and communicated to output server 16 for storage on document management system 26b. Similarly, if a user selects fax icon 92c, the web browser image may be captured in a native format, converted to an intermediate format and communicated to output server 16 for faxing by facsimile machine 26c.

The foregoing merely illustrates the principles of this invention, and various modifications can be made by persons of ordinary skill in the art without departing from the scope and spirit of this invention.

The invention claimed is:

1. A system for use with a client device that includes a web browser adapted to display information in a web page, the system comprising:
  an input module adapted to run on the client device and to capture a full page of the displayed information in a native format, convert the native format data to an intermediate format on the client device, and communicate the intermediate format data over a network from the client device; and
  an output server adapted to receive the intermediate format data from the network, convert the intermediate format data to an output format, and communicate the output format data to an output device.

2. The system of claim 1, wherein the native format comprises a hypertext markup language.

3. The system of claim 1, wherein the intermediate format comprises at least one of a bitmap ("BMP"), a graphics interchange format ("GIF"), a Joint Photographic Experts Group ("JPEG"), a tagged image file format ("TIFF"), or a portable network graphic ("PNG") format.

4. The system of claim 1, wherein the network comprises at least one of a local area network, a wide area network, a public network, or the Internet.

5. The system of claim 1, wherein the output format comprises a page description language.

6. The system of claim 1, wherein the output format comprises a page description format ("PDF").

7. The system of claim 1, wherein the output format comprises a PostScript format.

8. The system of claim 1, wherein the output format comprises print stream data.

9. The system of claim 1, wherein the output format comprises document management system data.

10. The system of claim 1, wherein the output format comprises facsimile data.

11. The system of claim 1, wherein the output device comprises at least one of a printer, a print server, a copier, a facsimile device, an email server, a storage device, or a document management system.

12. The system of claim 1, wherein the input module comprises a user interface.

13. The system of claim 12, wherein the user interface comprises a toolbar installed in the web browser.

14. The system of claim 12, wherein the user interface comprises an icon.

15. The system of claim 1, wherein the output device is adapted to print the output format data.

16. The system of claim 1, wherein the input module comprises a web page capture module.

17. The system of claim 1, wherein the input module comprises a transport module.

18. The system of claim 1, wherein the output module comprises a receiver module.

19. The system of claim 1, wherein the output module comprises an output format converter module.

20. The system of claim 19, wherein the output format converter module comprises a plurality of output converter modules.

21. The system of claim 1, wherein the output format converter module comprises at least one of a printer converter module, a document management converter module, or a facsimile converter module.

22. A method for use with a client device that includes a web browser adapted to display information in a web page, the method comprising:
   capturing a full page of the displayed information in a native format on the client device;
   converting the native format data to an intermediate format on the client device;
   communicating the intermediate format data from the client device over a network to an output server;
   receiving the intermediate format data from the network at the output server;
   converting the intermediate format data to an output format; and
   communicating the output format data to an output device.

23. The method of claim 22, wherein the native format comprises a hypertext markup language.

24. The method of claim 22, wherein the intermediate format comprises at least one of a bitmap ("BMP"), a graphics interchange format ("GIF"), a Joint Photographic Experts Group ("JPEG"), a tagged image file format ("TIFF"), or a portable network graphic ("PNG") format.

25. The method of claim 22, wherein the network comprises at least one of a local area network, a wide area network, a public network, or the Internet.

26. The method of claim 22, wherein the output format comprises a page description language.

27. The method of claim 22, wherein the output format comprises a page description format ("PDF").

28. The method of claim 22, wherein the output format comprises a PostScript format.

29. The method of claim 22, wherein the output format comprises print stream data.

30. The method of claim 22, wherein the output format comprises document management system data.

31. The method of claim 22, wherein the output format comprises facsimile data.

32. The method of claim 22, wherein the output device comprises at least one of a printer, a print server, a copier, a facsimile device, an email server, a storage device, or a document management system.

33. The method of claim 22, further comprising providing a user interface.

34. The method of claim 33, wherein the user interface comprises a toolbar installed in the web browser.

35. The method of claim 33, wherein the user interface comprises an icon.

36. The method of claim 22, further comprising printing the output format data at the output device.

* * * * *